(12) United States Patent
Wu

(10) Patent No.: US 9,377,642 B2
(45) Date of Patent: Jun. 28, 2016

(54) BACK FRAME FOR INSTALLING BACK LIGHT SOURCE, A BACK LIGHT SOURCE AND A DISPLAY DEVICE

(71) Applicant: BOE TECHNOLOGY GROUP CO., LTD., Beijing (CN)

(72) Inventor: Zhongbao Wu, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 4 days.

(21) Appl. No.: 14/105,659

(22) Filed: Dec. 13, 2013

(65) Prior Publication Data

US 2014/0168565 A1    Jun. 19, 2014

(30) Foreign Application Priority Data

Dec. 14, 2012  (CN) .......................... 2012 1 0545743

(51) Int. Cl.
| | |
|---|---|
| *G02F 1/1335* | (2006.01) |
| *G02F 1/1333* | (2006.01) |
| *F21V 8/00* | (2006.01) |
| *F21V 15/01* | (2006.01) |

(52) U.S. Cl.
CPC .......... *G02F 1/133308* (2013.01); *F21V 15/01* (2013.01); *G02B 6/009* (2013.01); *G02B 6/0011* (2013.01); *G02B 6/0088* (2013.01); *G02B 6/0093* (2013.01); *G02F 2001/133314* (2013.01)

(58) Field of Classification Search
CPC ........................ G02F 1/133308; G02B 6/0011
USPC ...................................... 349/61–65
See application file for complete search history.

(56) References Cited

U.S. PATENT DOCUMENTS

| | | | | |
|---|---|---|---|---|
| 2009/0316341 A1* | 12/2009 | Huang | ...................... | 361/679.01 |
| 2010/0208173 A1* | 8/2010 | Kawana et al. | .................. | 349/71 |
| 2011/0090426 A1* | 4/2011 | Choi | ...................... | G02B 6/009 349/65 |
| 2012/0176815 A1* | 7/2012 | Sakamoto et al. | ............ | 362/633 |
| 2013/0258230 A1* | 10/2013 | Yu | ................................... | 349/58 |

FOREIGN PATENT DOCUMENTS

| | | |
|---|---|---|
| CN | 201740943 U | 2/2011 |
| CN | 102606963 A | 7/2012 |

(Continued)

OTHER PUBLICATIONS

Chinese Patent No. CN 2012105457438 Third Office Action; dated Feb. 17, 2015; 4 pages [with English Translation].
Chinese First Office Action Dated Jan. 6, 2014, Application No. 201210545743.8, 9 Pages.

(Continued)

*Primary Examiner* — Paul Lee
(74) *Attorney, Agent, or Firm* — Brooks Kushman P.C.

(57) ABSTRACT

The embodiments of the present invention provide a back frame for installing back light source, a back light source and a display device. The back frame comprises a frame body having an accommodation space for holding a light guide plate; a light source seat detachably connected to said frame body for placing a light source. In the embodiments of the present invention, the light source seat and the frame body are connected detachably so that the light source disposed on the light source seat can be detached from the back frame, which realizes that the light source can be replaced without the need of detaching the display panel, the environment inside the back light source is not destroyed, the material inside the back light source is not harmed or destroyed, thus the replacement cost is reduced and the waste of resources is avoided.

9 Claims, 4 Drawing Sheets

(56) References Cited

FOREIGN PATENT DOCUMENTS

| | | |
|---|---|---|
| CN | 102628583 A | 8/2012 |
| CN | 102734189 A | 10/2012 |

OTHER PUBLICATIONS

Second Chinese Office Action Dated Sep. 2, 2014, Application No. 201210545743.8, Applicant Boe Technology Group Co., Ltd., 7 Pages.

* cited by examiner

BACK FRAME FOR INSTALLING BACK LIGHT SOURCE, A BACK LIGHT SOURCE AND A DISPLAY DEVICE

CROSS-REFERENCE TO RELATED APPLICATIONS

This application claims priority to Chinese application No. 201210545743.8, filed Dec. 14, 2012, which is hereby incorporated by reference in its entirety.

TECHNICAL FIELD

The embodiments of the present invention relate to the field of display, especially relates to a back frame for installing back light source, a back light source and a display device.

BACKGROUND

An LCD (Liquid Crystal Display) display cannot give out light itself, it needs to be supported by a back light source to realize color-developing in order to see the contents showing on the LCD display clearly. An edge in type back light module is generally composed of necessary optical components such as a light source, a film sheet, a reflector sheet, a light guide plate and a back plate and so on.

A back light unit is an important constituent part of the LCD device, it comprises a back light source and components for installing the back light source, and its structure, assembling, cost and weight are all important technical index. In the existing whole back light unit, the back plate and the sealant frame for holding back light source and (display) panel always play an important role.

The back plate in the traditional back light unit is used for placing the back light source. The light guide plate, optical film sheet and light source are disposed into the back plate, then the sealant frame is pressed onto the back plate to constitute the back light unit. The display panel is disposed on the sealant frame, and then the display panel is buckled to the back light unit by the front frame so as to constitute the back light module. When the light source goes wrong and needs to be replaced, it needs to detach the display panel first, and then detach the back light unit, so that the light source can be replaced. It is easy to destroy the display panel in the changing process, and it is easier to destroy the optical film sheet and the light guide plate in the back light unit, thereby the intrinsic display effect of the display device is destroyed or the resources are wasted.

SUMMARY

The technical problem to be resolved by the embodiments of the present invention is that the light source of the existing display device, the light guide plate and the optical film sheet are packaged in the sealant frame located below the display panel, thereby when replacing the light source, the display panel and the back light unit needs to be detached, which can easily destroy the display panel, and more easily destroy the optical film sheet and the light guide plate in the back light unit, thus the intrinsic display effect of the display device is destroyed or the resources are wasted.

To solve the above-mentioned problem, the embodiments of the present invention provide a back frame for installing a back light source, comprising:

a frame body having an accommodation space for holding a light guide plate; and a light source seat detachably connected to said frame body for placing a light source.

In the above mentioned back frame, a groove for placing a display panel is disposed on said frame body.

In the above mentioned back frame, said light source seat and said frame body are connected by snap connection, hinge connection, insertion or threaded connection.

In the above mentioned back frame, said light source comprises a protruding portion and a hole, a slot and a hook are disposed on said frame body, the protruding portion and said slot are connected with each other by insertion, said hook and said hole are connected with each other by snap.

In the above mentioned back frame, said protruding portion is a protrusion or a connection sheet.

In the above mentioned back frame, said light source seat is made up of heat dispersing material.

In the above mentioned back frame, said light source is pasted on said light source seat.

The embodiments of the present invention further provide a back light source, comprising:

a light source;

a light guide plate;

a back frame, comprising a frame body having an accommodation space and comprising a light source seat; and said light guide plate is disposed in said accommodation space, said light source seat and said frame body are connected detachably, said light source is disposed on said light source seat.

In the above mentioned back light source, a groove for placing a display panel is disposed on said frame body.

The embodiments of the present invention further provide a display device, comprising said back light source.

The advantageous effects of above technical solutions of the embodiments of the present invention are that: in the embodiments of the present invention, the light source seat and the frame body are connected detachably so that the light source disposed on the light source seat can be detached from the back frame, which realizes that the light source can be replaced without the need of detaching the display panel and the back light unit, thus the replacement cost is reduced and the waste of resources is avoided. The back frame of the embodiments of the present invention is an integral structure, comparing with the assembly of the sealant frame and the back plate in the prior art, the weight of the back light module itself is reduced, the structure components used in the back light module are reduced, and the cost of the back light module is reduced, the available space inside the back light module is enlarged. Ultra-narrow frame can be used to improve the heat dissipation performance of the light source, and it has good buffer capacity so as to increase the shock resistance of the back light module, especially the light source can be detached easily and replaced readily.

The present invention will be more clearly understood from the description of preferred embodiments as set forth below, with reference to the accompanying drawings.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Hereafter, the embodiments will be described in detail with reference to the drawings so as to make the technical problem to be solved, the technical solution and the advantage clearer.

Figure 1:
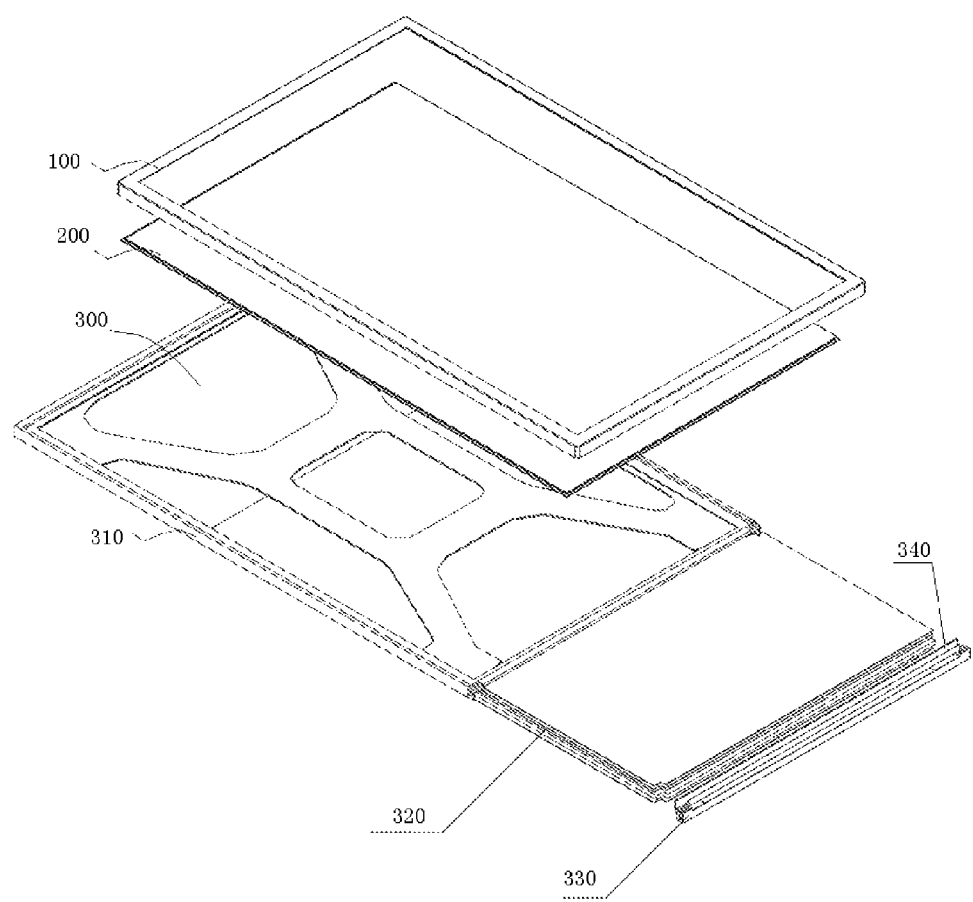
FIG. 1 shows a partial structural schematic view of the display device according to one embodiment of the present invention.

As shown in FIG. 1, it shows a partial structural schematic view of a display device according to one embodiment of the present invention, the display device comprises a front frame 100, a display panel 200 and a back light source 300, the back light source 300 comprises a light source 340, a light guide plate 320 and a back frame, the back frame comprises a frame body 310 having an accommodation space for holding the light guide plate 320 and a light source seat 330 detachably connected to the frame body 310, the light source 340 is disposed on the light source seat 330 for providing light source to the light guide plate 320 in the accommodation space. In order to further enhance the shining effect of the light, other optical film sheets such as a diffuse sheet, a reflector sheet are disposed on one side of the light guide plate 320, these other optical film sheets are also disposed in the accommodation space of the frame body 310.

The display panel 200 is disposed on one side of the back frame for receiving light from the back light source 300, a front frame 100 is disposed on the other side of the display panel 200 for assembling the display panel 200 on the back frame. In the embodiments of the present invention, the light source of the display device and the frame body are connected detachably by the light source seat, so that the light source can be detached from the back frame, and the light source can be replaced without the need of detaching the display panel and the back light unit, which reduces the damage to the components in the display panel and the back light unit as far as possible, thus the replacement cost is reduced and the waste of resources is avoided.

Moreover, comparing with the assembly of the sealant frame and the back plate in the prior art, the back frame of the embodiments of the present invention is an integral structure, the display panel and the back light source are held by one back frame, so that the weight of the back light module itself is reduced, the structure components used in the back light module are reduced, and the cost of the back light module is reduced, the available space inside the back light module is enlarged. Ultra-narrow frame can be used to improve the heat dissipation performance of the light source, and it has good buffer capacity so as to increase the shock resistance of the back light module.

In order to improve the heat dissipation effect of the light source, preferably, the light source seat is made up of heat dispersing material such as metal of aluminum, copper, thus the heat dissipation effect of the light source is improved. The light source in the embodiment is an LED lamp strip, the LED lamp strip is pasted on one side of the light source seat by a double faced adhesive tape having high-thermal conductivity. The thickness and area of the light source seat can be adjusted according to the thermal value of the LED lamp strip so as to ensure good heat dissipation effect. The LED lamp strip is pasted on one side of the light source seat which has heat dissipation function, and the heat is transferred outward by the light source seat which has the heat dissipation function.

Figure 2:
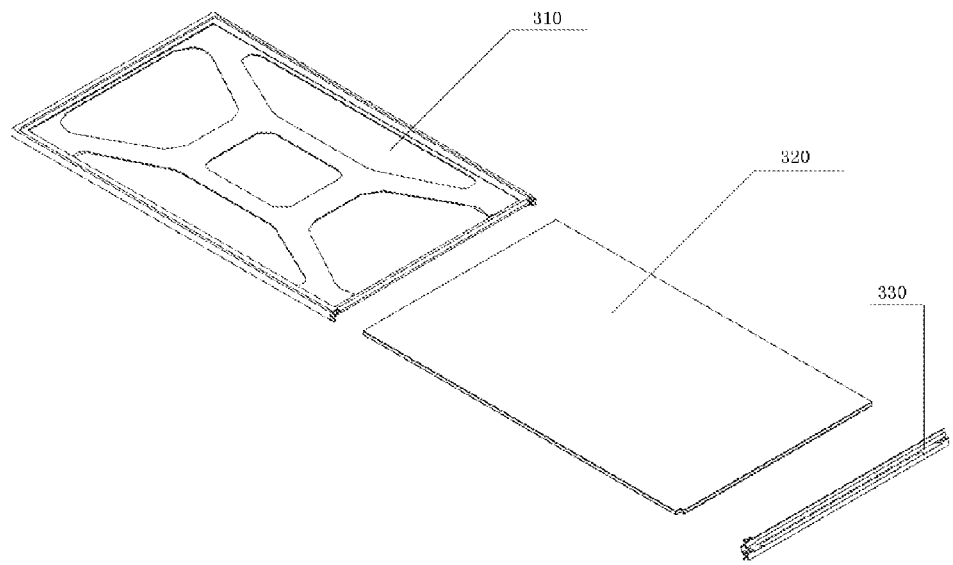
FIG. 2 shows an exploded view of the back light source according to one embodiment of the present invention.

As shown in FIG. 2, it shows an exploded view of the back light source according to one embodiment of the present invention. The back light source comprises the light source, the light guide plate 320 and the back frame, the back frame comprises the frame body 310 having the accommodation space and the light source seat 330, the light guide plate 320 is disposed in the accommodation space, the light source is disposed on the light source seat 330 which is detachably connected to the frame body 310. The accommodation space in the frame body 310 is used for holding the light guide plate 320 and other optical film sheets. The frame body 310 can have any appropriate structures and have a clearance fit with the light guide plate 320. The light source of the back light source of the embodiments of the present invention can be detached from the back frame and replaced at any time even an object is disposed on the back frame.

Figure 3:
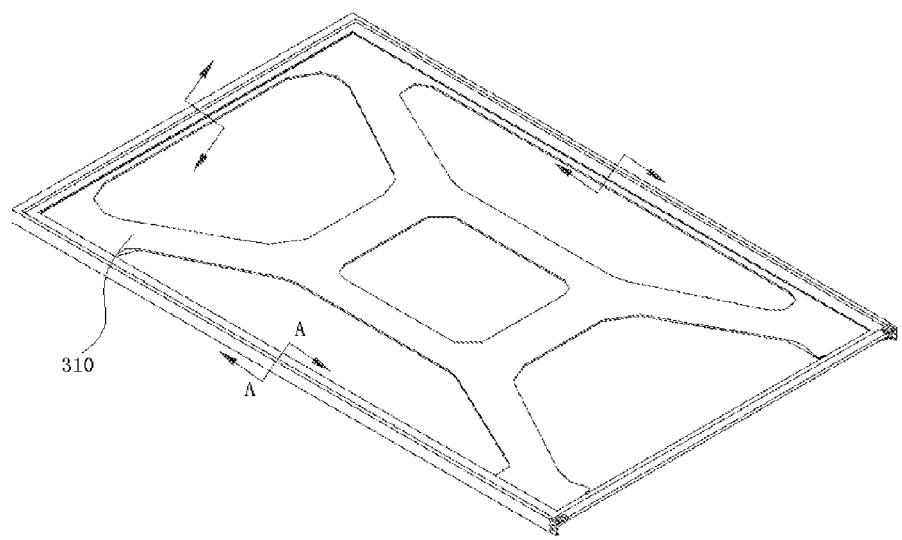
FIG. 3 shows a structural schematic view of the frame body according to one embodiment of the present invention.
Figure 4:
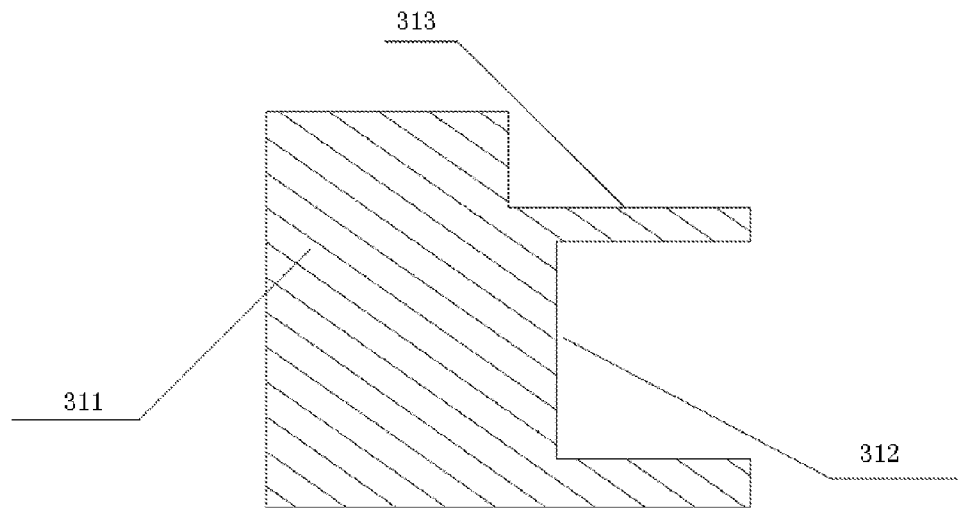
FIG. 4 shows a cross sectional view along A-A in the FIG. 3.

As shown in FIGS. 3 and 4, FIG. 3 shows a structural schematic view of the frame body according to one embodiment of the present invention. The frame body 310 in the embodiment comprises a framing 311 and an accommodation space 312, the accommodation space has an opening from which the light guide plate is placed into the accommodation space. FIG. 4 shows a cross sectional view along A-A in the FIG. 3. It can be seen from the view that a groove 313 for placing the display panel is provided on the surface of the framing, the display panel is held by the groove, so that the display panel and the back light source can be held by one back frame. The framing 311 comprises a first layer, a second layer and a baffle plate around the first layer and the second layer, an accommodation space is formed between the first layer and the second layer, and a hollow structure is formed on the first layer so that the material is reduced.

Figure 5:
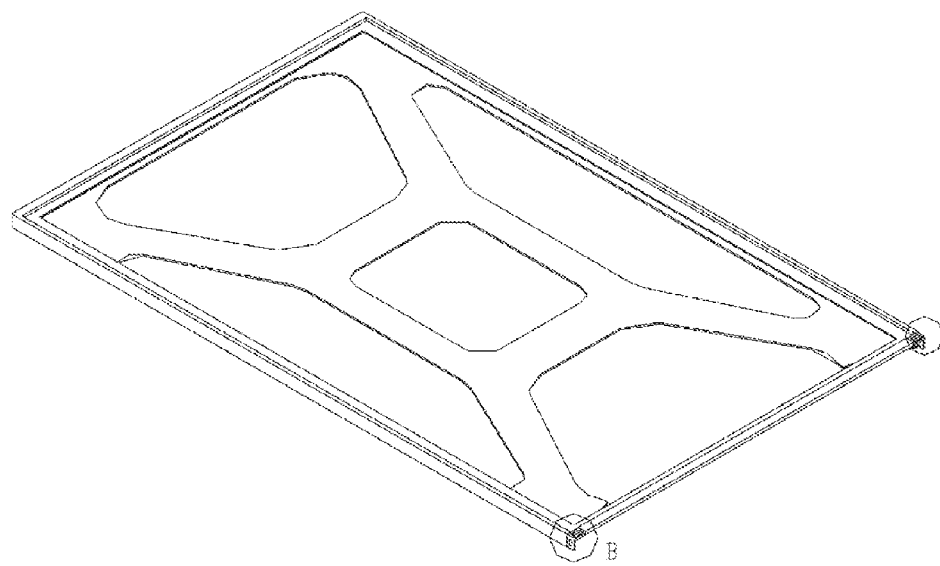
FIG. 5 shows a structural schematic view of the frame body and the light source seat according to one embodiment of the present invention.
Figure 6:
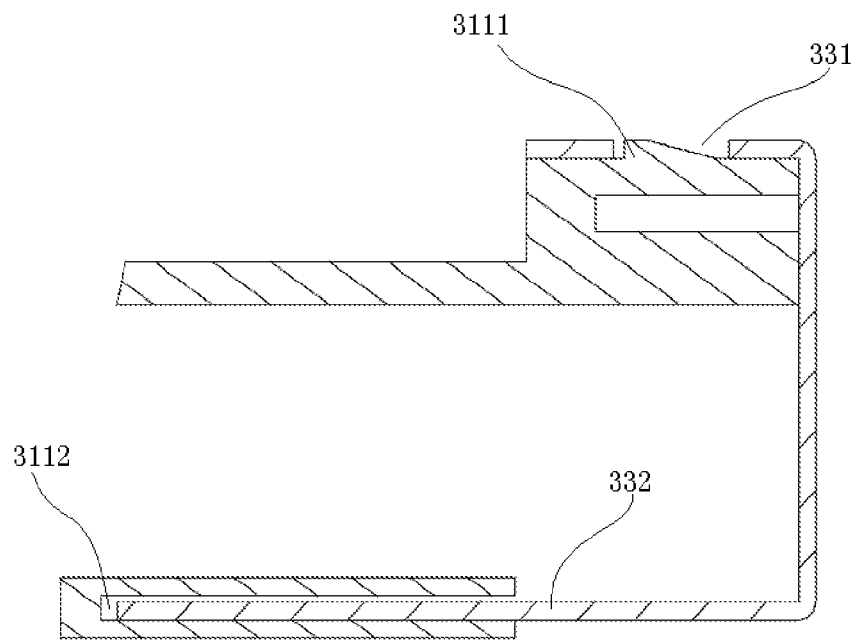
FIG. 6 shows an enlarged cross sectional view of B in FIG. 5.

As shown in FIGS. 5 and 6, FIG. 5 shows a structural schematic view of the frame body and the light source seat according to one embodiment of the present invention, the frame body and the light source are connected detachably by means of snap connection, hinge connection, insertion or threaded connection. FIG. 6 shows a cross sectional view of B in FIG. 5, i.e. the cross sectional view of the joint of the frame body and the light source seat, it can be seen from the view that the light source seat in the embodiment comprises a protruding portion 332 and a hole 331, the protruding portion 332 can be a protrusion, a connection sheet and so on. A slot 3112 and a hook 3111 are disposed on the positions of the framing 311 of the frame body that corresponding to the light source seat, the protruding portion 332 and the slot 3112 are connected with each other by insertion, the hook 3111 and the hole 331 are connected with each other by snap. In the embodiment, the protruding portion is a connection sheet, the connection sheet is connected to the light source seat, and the connection sheet is inserted in the slot of the frame body. When the light source seat needs to be detached, the hook can be pressed, the light source seat is separated from the frame body, the light source seat is withdrawn from the slot, the separation between the light source seat and the frame body is achieved, thereby the light source can be withdrawn from the back frame without detaching the display panel and the back light source. Both of the frame body and the light source seat in the embodiment limit the position of the back light source, a snapping structure which is cooperated with the light source seat is disposed on the framing of the frame body, this structure is used for limiting the free degree of the light source seat in the direction away from back light. Certainly, the hole and the protruding portion can be provided on the framing, and the slot and the hook can be provided on the light source seat, so that both of them can be connected detachably likewise.

Figure 7:
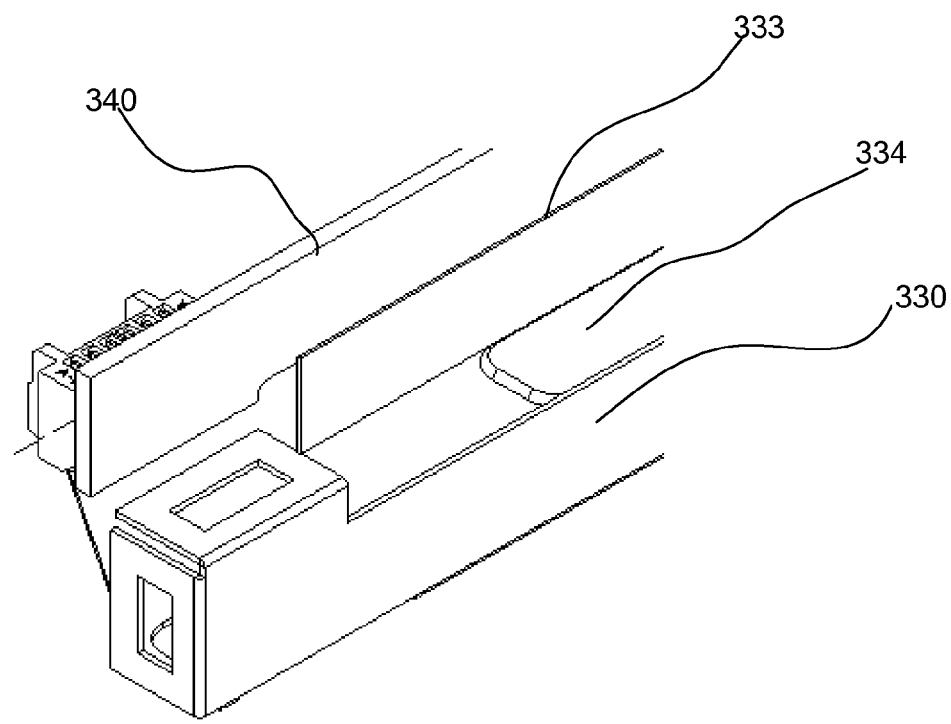
FIG. 7 shows a structural schematic view of the light source and the light source seat according to one embodiment of the present invention.

As shown in FIG. 7, it shows a structural schematic view of the light source and the light source seat according to one embodiment of the present invention. The light source is installed on the light source seat, the light source 340 is an LED lamp strip, the LED lamp strip is pasted on one side of the light source seat by a double faced adhesive tape 333 having high-thermal conductivity. The thickness and area of the light source seat can be adjusted according to the thermal value of the LED lamp strip so as to ensure good heat dissipation effect. The light source seat in the embodiment is a metal light source seat, the LED lamp strip is pasted on one side of the metal light source seat, and the heat of the LED lamp strip is transferred outward by the heat dissipation metal plate of the metal light source seat. In the embodiment, two flanges are disposed respectively on both ends of the metal light source seat on the side facing the light source, the flange is provided with a hole, the hole is used for fixed connection with the framing of the frame body of the back frame. A connection sheet is disposed on the edge of the light source seat. Because the surface of the slot of the framing of the frame body is higher than the connection sheet, the light guide plate will have a problem of inclining at the joint between the light source seat and the frame body, thereby in order to make the light guide plate at the joint between the light source seat and the frame body has a same height, a boss 334 is disposed on the contact surface between the connection sheet and the light guide plate so as to hold the light guide plate and the optical film sheet on the light entering side by the boss 334.

A assembly process of the above mentioned back light source of the embodiments of the present invention comprises the steps as follows:

Step 1: inserting the light guide plate and the optical film sheet into the accommodation space from the side opening of the frame body, and pushing the light guide plate and the optical film sheet to the limiting position of the accommodation space.

Step 2: pasting the light source on one side of the light source seat, then aiming the side of the light source seat on which the light source is disposed at the opening of the accommodation space, gently pushing the light source seat to be inserted in the slot of the framing of the frame body, both ends of the light source seat are snapped with the snapping structure of the framing of the frame body of the back frame.

When the light source needs to be replaced, the light source is detached from the frame body to replace the light source, and reassembly is carried out according to the above mentioned steps.

With the above mentioned technical solution, the light source of the display device and the frame body are connected detachably by the light source seat, the light source can be detached from the back frame, and the light source can be replaced without the need of detaching the display panel and the back light unit, thus the replacement cost is reduced and the waste of resources is avoided.

The described above are only the preferred embodiments of the present invention, it should be pointed out that, it can be made some improvements and embellishment on the premise of without departing from the principle of the embodiments of the present invention by those skilled in the art, these improvement and embellishment should be seen as the protection scope of the embodiments of the present invention as well.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A back frame for installing back light source, comprising:
    a frame body having an accommodation space for holding a light guide plate; and
    a light source seat detachably connected to the frame body for placing a light source,
    wherein said frame body comprises a framing, the framing comprises a first layer, a second layer and a baffle plate around the first layer and the second layer,
    a hollow surface is formed in the first layer,
    the light guide plate is arranged on the first layer,
    the accommodation space is formed between the first layer and the second layer, and has an opening from which the light guide plate is placed into the accommodation space,
    the framing further comprises a slot and a hook, which are integrally formed with the baffle plate and on a side of the framing where the opening is arranged,
    the light source seat comprises a protruding portion and a hole,
    the protruding portion and the slot are connected with each other by insertion, the hook and the hole are connected with each other by snap connection, and
    the light source is pasted on the light source seat by a double faced adhesive tape having high-thermal conductivity.

2. The back frame according to claim 1, wherein a groove for placing a display panel is disposed on the frame body.

3. The back frame according to claim 1, wherein the protruding portion is a protrusion or a connection sheet.

4. The back frame according to claim 1, wherein the light source seat is made up of heat dispersing material.

5. A back light source, comprising:
    a light source;
    a light guide plate; and
    a back frame, comprising a frame body having an accommodation space and a light source seat wherein;
    the frame body comprises a framing, the framing comprises a first layer, a second layer and a baffle plate around the first layer and the second layer,
    a hollow structure is formed in the first layer,
    the light guide plate is arranged on the first layer,
    the accommodation space is formed between the first layer and the second layer, and has an opening from which the light guide plate is placed into the accommodation space,
    the framing further comprises a slot and a hook, which are integrally formed with the baffle plate and on a side of the framing where the opening is arranged,
    the light source seat comprises a protruding portion and a hole,
    the protruding portion and said slot are connected with each other by insertion, the hook and the hole are connected with each other by snap connection, and the light source is pasted on the light source seat by a double faced adhesive tape having high-thermal conductivity.

6. The back light source according to claim 5, wherein a groove for placing a display panel is disposed on the frame body.

7. A display device, comprising the back light source according to claim 5.

8. The display device according to claim 7, wherein a groove for placing a display panel is disposed on the frame body.

9. A back frame for installing back light source, said back frame comprising:
   a frame body having an accommodation space for holding a light guide plate, the frame body comprising a framing comprising a first layer, a second layer and a baffle plate around the first layer and the second layer, and a hollow surface in the first layer;

the light guide plate being arranged on the first layer, the accommodation space being disposed between the first layer and the second layer, and having an opening in which the light guide plate is disposed, the framing further comprising a slot and a hook, which are integrally formed with the baffle plate and on a side of the framing where the opening is arranged; and a light source seat detachably connected to the frame body for placing a light source, the light source seat comprises a protruding portion and a hole, with the protruding portion and the slot being connected with each other by insertion, the hook and the hole are connected with each other by snap connection, and the light source being disposed on the light source seat by a double faced adhesive tape having high-thermal conductivity.

* * * * *